United States Patent

Kojima et al.

[11] Patent Number: 6,161,781
[45] Date of Patent: Dec. 19, 2000

[54] FUEL INJECTOR FOR AN INTERNAL COMBUSTION ENGINE

[75] Inventors: Susumu Kojima, Susono; Keiso Takeda, Mishima; Tomojiro Sugimoto, Susono, all of Japan

[73] Assignee: Toyota Jidosha Kabushiki Kaisha, Toyota, Japan

[21] Appl. No.: 09/184,050

[22] Filed: Nov. 2, 1998

[30] Foreign Application Priority Data

Mar. 26, 1998 [JP] Japan .................................. 10-079968

[51] Int. Cl.[7] ...................................................... F02M 61/00
[52] U.S. Cl. ................................ 239/533.12; 239/533.3; 239/584; 239/596; 239/601
[58] Field of Search ............................ 239/533.3, 533.8, 239/533.9, 533.12, 568, 584, 596, 601

[56] References Cited

U.S. PATENT DOCUMENTS

| | | | |
|---|---|---|---|
| 4,057,190 | 11/1977 | Kiwior et al. | 329/533.12 X |
| 4,313,407 | 2/1982 | Müller . | |
| 4,591,099 | 5/1986 | Emory et al. . | |
| 5,244,154 | 9/1993 | Buchholz et al. | 239/596 X |
| 5,437,413 | 8/1995 | Shen et al. | 239/533.12 X |
| 5,484,108 | 1/1996 | Nally | 239/533.12 X |
| 5,762,272 | 6/1998 | Tani et al. | 239/596 X |
| 5,772,124 | 6/1998 | Tamaki et al. | 239/533.12 |

FOREIGN PATENT DOCUMENTS

| | | |
|---|---|---|
| 446 892 | 12/1912 | France . |
| 827-772 | 5/1938 | France . |
| 159433 | 5/1943 | Japan . |
| 3-78562 | 4/1991 | Japan . |
| 3-225070 | 10/1991 | Japan . |
| 5-83368 | 11/1993 | Japan . |
| 7-63140 | 3/1995 | Japan . |
| 7-151037 | 6/1995 | Japan . |

Primary Examiner—Andres Kashnikow
Assistant Examiner—Steven J. Ganey
Attorney, Agent, or Firm—Oliff & Berridge, PLC

[57] ABSTRACT

A fuel injector for an internal combustion engine is disclosed. The injector has a valve body, an injection hole which has a width larger than a height thereof, and a fuel reservoir on the downstream side of a seat portion of the valve body. The fuel reservoir has a side surface and a bottom surface. One part of the side surface imparts one velocity component oriented in the direction of width in the injection hole to the fuel flow along the one part of the side surface. Another part of the side surface imparts another velocity component oriented in the direction of width in the injection hole to the fuel flow along the another part of the side surface. The bottom surface is formed at right angles with the center axis of the injection hole. The injection hole is communicated with the fuel reservoir via the bottom surface thereof.

7 Claims, 8 Drawing Sheets

FUEL INJECTOR FOR AN INTERNAL COMBUSTION ENGINE

BACKGROUND OF THE INVENTION

1. Field of the Invention

The present invention relates to a fuel injector for an internal combustion engine and, particularly, to a fuel injector for an internal combustion engine having a slit-like injection hole to produce a spray of a flat fan shape.

2. Description of the Related Art

In a fuel injector for supplying fuel to an internal combustion engine, the injection hole is made slit-like to produce a spray of a flat fan shape. Japanese Unexamined Patent Publication No. 3-78562 discloses such a fuel injector for an internal combustion engine. The spray of a flat fan shape formed by the fuel injected from the slit-like injection hole of this fuel injector has a small dispersion in concentration and a greatly increased surface area of the spray compared with that of ordinary conical spray, enabling nearly all of the fuel to come into sufficient contact with the air and, hence, to be quickly atomized and mixed. This makes it possible to supply, to the internal combustion engine, a fuel spray in which the fuel is sufficiently atomized and which has a small dispersion in concentration.

FIG. 14 is an enlarged sectional view illustrating the vicinity of an injection hole of a conventional fuel injector for an internal combustion engine, wherein reference numeral 7a denotes a valve body, 7b denotes a fuel reservoir of a hemispherical shape communicated with the injection hole 8, and 7c denotes a nozzle seat portion which can be closed by the valve body 7a. An opening on the outer side of the injection hole 8 at the downstream end in a direction in which the fuel is injected, is made flat and has the shape of a nearly rectangular slit. The injection hole 8 has nearly a fan shape of which the width is gradually narrowed inward, i.e., gradually narrowed toward the upstream side in the direction in which the fuel is injected, so that the fuel can be injected at a predetermined angle in the direction of width. Here, the injection hole 8, the valve body 7a, and the fuel reservoir 7b are formed such that their center axes are on a center axis (C) of the fuel injection valve 7. However, an error in the formed position can occur. For example, FIG. 15 illustrates a state where the injection hole 8 is formed to deviate leftward in the direction of width of the injection hole 8 with respect to the center axis (C) of the fuel injection valve 7, i.e., the state where the injection hole 8 is formed to deviate leftward by an amount of deviation S. Here, symbol (C') denotes the center axis of the injection hole 8.

Referring to FIG. 14, when the center of the fuel reservoir 7b corresponds to the center of the injection hole 8, the fuel flows F1 along the wall surface of the fuel reservoir 7b on the right side and on the left side of the injection hole 8 become symmetrical, and thus the fuel flows symmetrically into the injection hole 8. As described above, furthermore, the fuel reservoir 7b has a hemispherical shape. With the wall surface of the fuel reservoir 7b being shaped as a spherical surface, the fuel flow F1 heading into the injection hole 8 is tilted and possesses velocity components oriented in the direction of width in the injection hole 8. Thus, the fuel is uniformly distributed in the injection hole 8, and is favorably sprayed in compliance with the shape of the injection hole.

Referring to FIG. 15, on the other hand, when the injection hole 8 is deviated in the direction of width and the center of the fuel reservoir 7b does not correspond to the center of the injection hole 8, the fuel flow F2 along the wall surface on the left side of the fuel reservoir 7b and the fuel flow F3 along the wall surface on the right side become asymmetrical with respect to the injection hole 8. That is, the flow-in angle differs depending on the right side and the left side in the injection hole 8. Accordingly, the flow of fuel loses symmetry in the injection hole 8, the fuel is unevenly distributed in the injection hole 8, and the fuel is not sprayed in compliance with the shape of the injection hole. When the spray of a flat fan shape is formed by the slit-like injection hole, the spray is distributed to have a relatively small thickness in the flattened direction. Therefore, uniformity is required in the fuel flow. When the flow of fuel becomes nonuniform, the shape of the spray is greatly disturbed, and the injected fuel loses uniformity in its distribution. Strictly speaking, furthermore, due to deviation in the position of the injection hole 8 as shown in FIG. 15, the area of the opening facing the fuel reservoir 7b in the injection hole 8 undergoes a change, and the flow rate of the fuel is deviated from a preset value, making it difficult to supply the fuel in a desired amount.

SUMMARY OF THE INVENTION

The object of the present invention, therefore, is to provide a fuel injector for an internal combustion engine capable of forming a fuel spray of a flat fan shape in compliance with the shape of an injection hole even if the center axis of the fuel reservoir does not strictly correspond to the center axis of injection hole.

According to the present invention, there is provided a first fuel injector for an internal combustion engine having a valve body, an injection hole which has a width larger than a height thereof, and a fuel reservoir on the downstream side of a seat portion of the valve body, wherein the fuel reservoir has a side surface and a bottom surface, one part of the side surface imparts one velocity component oriented in the direction of width in the injection hole to the fuel flow along the one part of the side surface, another part of the side surface imparts another velocity component oriented in the direction of width in the injection hole to the fuel flow along the another part of the side surface, the bottom surface is formed at right angles with the center axis of the injection hole, and the injection hole is communicated with the fuel reservoir via the bottom surface thereof.

Moreover, according to the present invention, there is provided a second fuel injector for an internal combustion engine having a valve body, an injection hole which has a width larger than a height thereof, and a fuel reservoir on downstream side of a seat portion of the valve body, wherein the fuel reservoir is communicated with the injection hole, one part of the inside surface of the fuel reservoir imparts one velocity component oriented in the direction of width in the injection hole to the fuel flow along the one part of the inside surface, another part of the inside surface imparts another velocity component oriented in the direction of width in the injection hole to the fuel flow along said another part of the inside surface, a tip member is mounted on the body of the fuel injector, the injection hole and the one part and the another part of the inside surface of the fuel reservoir are formed on said tip member.

BRIEF DESCRIPTION OF THE DRAWINGS

In the drawings:

FIG. 2 is viewed from the direction of arrow A.

FIG. 4 is viewed from the direction of arrow B.

FIG. 6 is viewed from the direction of arrow C.

FIG. 8 is viewed from the direction of arrow D.

FIG. 10 is viewed from the direction of arrow E.

FIG. 12 is viewed from the direction of arrow G.

DESCRIPTION OF THE PREFERRED EMBODIMENT

Figure 1:
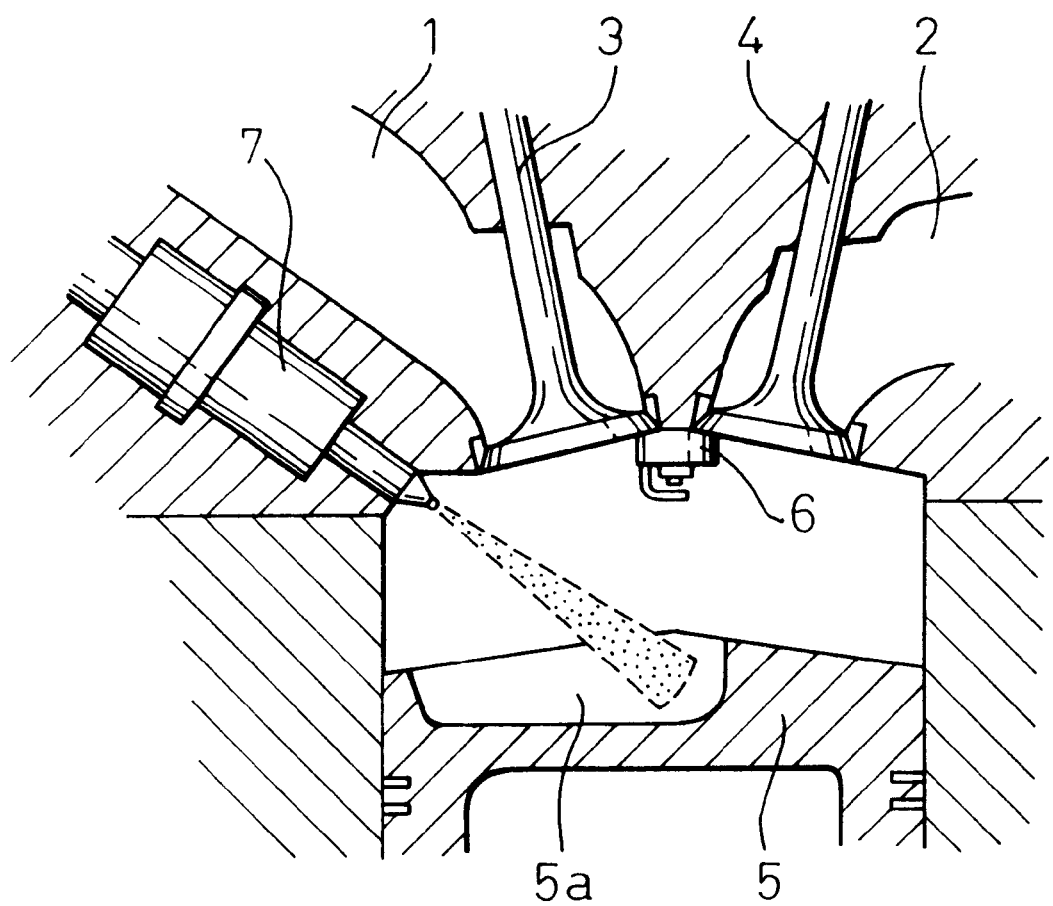
FIG. 1 is a sectional view schematically illustrating a direct cylinder injection type spark ignition internal combustion engine equipped with a fuel injector according to a first embodiment of the present invention.

FIG. 1 is a sectional view schematically illustrating a direct cylinder injection type spark ignition internal combustion engine equipped with a fuel injector 7 according to a first embodiment of the present invention. In FIG. 1, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston, 5a denotes a combustion chamber of a recessed shape formed in the top surface of the piston 5, and 6 denotes a spark plug arranged in an upper part of the combustion chamber. The fuel injection valve 7 directly injects the fuel into the cylinder.

Figure 2:
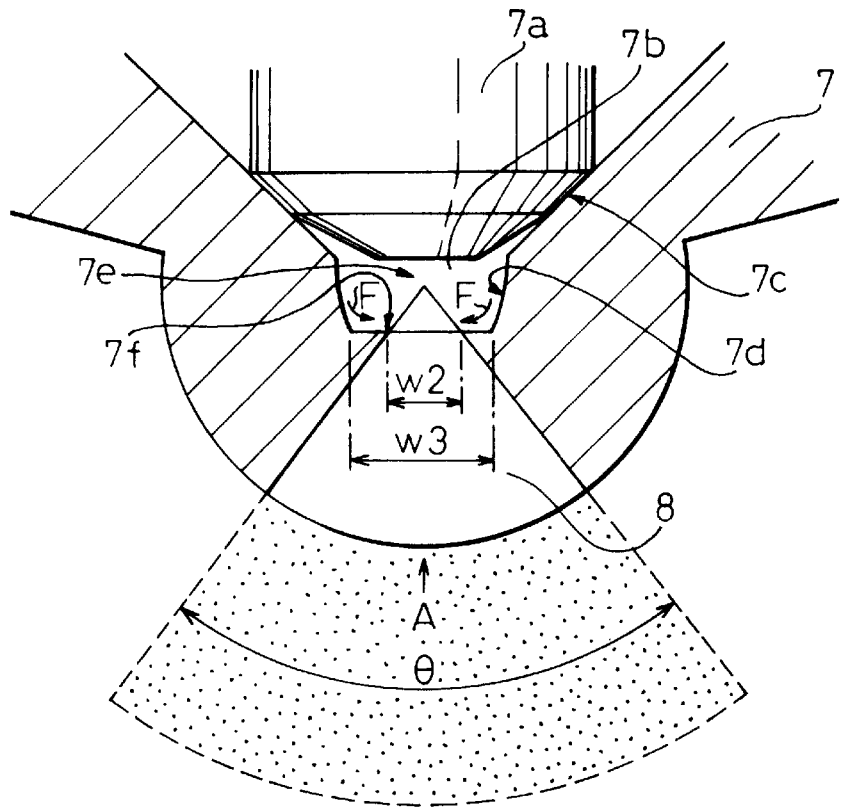
FIG. 2 is an enlarged sectional view illustrating the vicinity of an injection hole in the fuel injector of FIG. 1.
Figure 3:
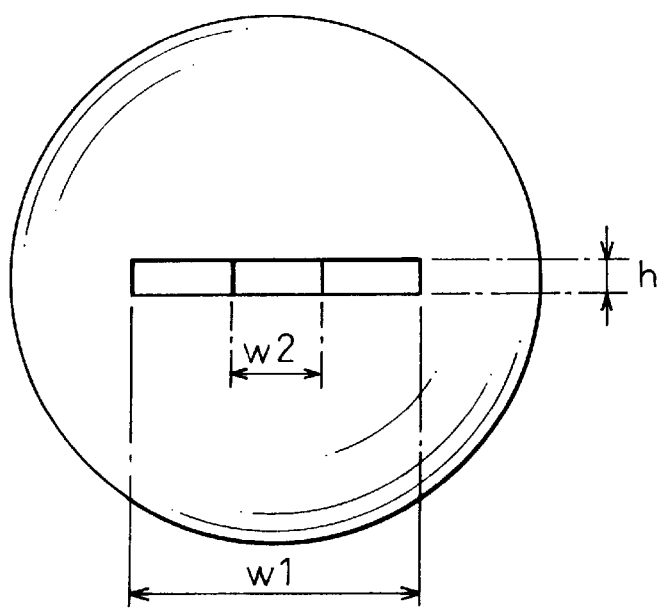
FIG. 3 is a view when

FIG. 2 is an enlarged sectional view illustrating the vicinity of an injection hole 8 of the fuel injector valve 7, and FIG. 3 is a view when FIG. 2 is viewed from the direction of arrow (A). In these drawings, reference numeral 7a denotes a valve body, 7b denotes a fuel reservoir communicated with the injection hole 8, and 7c denotes a nozzle seat portion that can be closed by the valve body 7a. The high pressure fuel is supplied to the fuel reservoir 7b via the nozzle seat portion 7c only when the valve body 7a is pulled up, whereby the fuel pressure in the fuel reservoir 7b is increased, and the fuel is injected from the injection hole 8.

An opening on the outer side of the injection hole 8 at the downstream end in a direction in which the fuel is injected, is flat in cross-section and has the shape of a nearly rectangular slit with a width (w1) larger in the flattened direction than a height (h) thereof. The injection hole 8 has nearly a fan shape of which the width is gradually narrowed inward, i.e., gradually narrowed toward the upstream side in the direction in which the fuel is injected, so that the fuel can be injected at a predetermined angle θ in the direction of width. The opening on the inner side at the upstream end in the direction in which the fuel is injected, is flat in cross-section and is communicated with the fuel reservoir 7b via a nearly rectangular cross-section with a height (h) and a width (w2). The height of the injection hole 8 is nearly uniform in the direction of injection of a fan shape at the predetermined angle θ in the direction of width. The side wall surface 7d of the fuel reservoir 7b is of a hemispherical shape having, as a center, the center of the predetermined angle θ in the direction of width for injecting the fuel, i.e., a vertex 7e of a fan of the injection hole 8, whereby the fuel pressure in the fuel reservoir 7b equally acts on each portion of the injection hole 8 in the direction of injection. The bottom portion of the fuel reservoir 7b forms a circular flat bottom surface 7f with a diameter (w3) larger than the width (w2) of the opening on the inner side of the injection hole 8 at right angles with the center axis in the direction of injecting the fuel or, in other words, at right angles to a bisector of the included angle of the fan shape of the injection hole 8. As a result, the fuel reservoir 7b has nearly a spherical zone shape.

As shown in FIGS. 1 and 2, the fuel injected from the injection hole 8 of the thus constituted fuel injector 7 forms a spray of a flat fan shape having a relatively small thickness corresponding to the height (h) of the injection hole 8, and almost all of the fuel comes into sufficient contact with the air taken into the cylinder and is favorably atomized. Furthermore, the bottom portion of the fuel reservoir 7b forms the flat bottom surface 7f having the diameter (w3) larger than the width (w2) of the opening on the inner side of the injection hole 8, and the opening on the inner side of the injection hole 8 is formed in the bottom surface 7f. If the difference between the width (w2) of the opening on the inner side of the injection hole and the diameter (w3) of the bottom surface of the fuel reservoir is set to be greater than an error at a position where the injection hole is formed, the opening on the inner side of the injection hole 8 is necessarily formed in the flat bottom surface 7f of the fuel reservoir 7b not only when the center axis of the injection hole 8 corresponds to the center axis of the fuel reservoir 7b but also when the position for forming the injection hole 8 is deviated and the center axis of the injection hole 8 does not correspond to the center axis of the fuel reservoir 7b. Accordingly, the flat bottom surface 7f necessarily exists around the opening on the inner side of the injection hole 8, and the fuel (F) flows along the wall surface of the fuel reservoir 7b from the spherical side wall surface 7d to the flat bottom surface 7f, and flows into the injection hole 8. Therefore, the flow-in angle into the injection hole 8 is uniformly limited by the flat bottom surface 7f of the fuel reservoir 7b at any portion, and becomes constant. Accordingly, even if the injection hole 8 is formed at a deviated position, the angle at which the fuel flows into the injection holes 8 remains unchanged, so that the fuel is uniformly distributed in the injection hole 8, making it possible to form a fuel spray in compliance with the shape of the injection hole.

Similarly, furthermore, the opening on the inner side of the injection hole 8 is necessarily formed in the flat bottom surface 7f of the fuel reservoir 7b. Therefore, even if an error occurs at the position for forming the injection hole 8, the opening on the inner side of the injection hole 8 has a constant sectional area, and the fuel is injected in a desired flow rate.

When the fuel injection valve 7 is used for a direct cylinder injection type spark-ignition internal combustion engine as shown in FIG. 1, the spray of a predetermined amount of fuel which is sufficiently atomized and has a small dispersion in the concentration, can be supplied into the combustion chamber 5a on the top surface of the piston 5 in a compression stroke to accomplish a stratified combustion. Therefore, the stratified combustion takes place more stably. Since the fuel spray has a small thickness, a relatively large amount of fuel can be introduced into the combustion chamber, and the region of stratified combustion can be expanded toward the high-load side.

Figure 4:
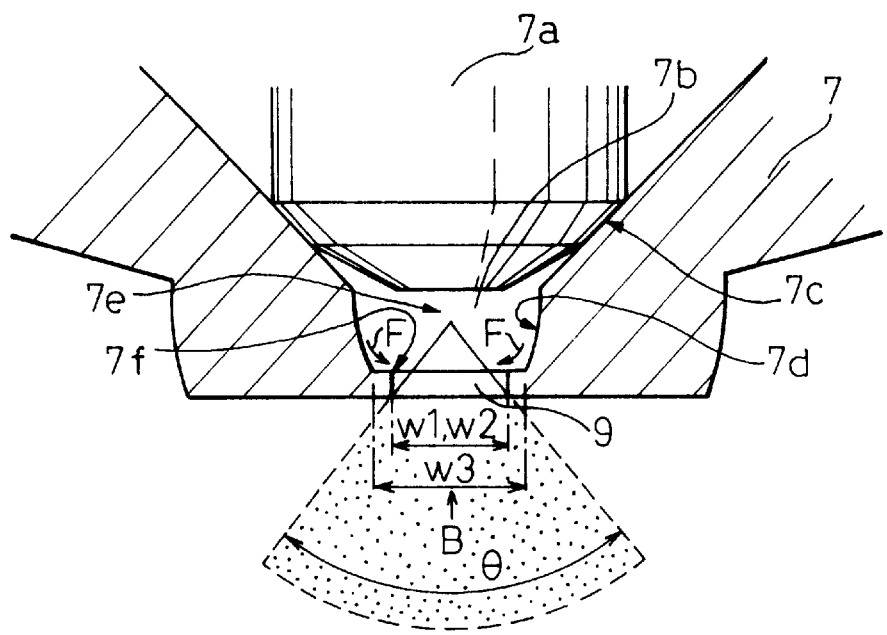
FIG. 4 is an enlarged sectional view illustrating the vicinity of the injection hole in the fuel injector according to a second embodiment of the present invention.
Figure 5:
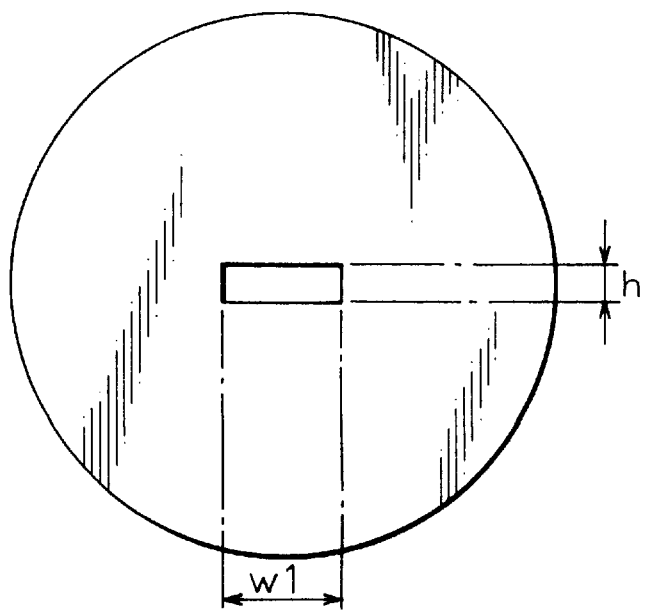
FIG. 5 is a view when

FIG. 4 is an enlarged sectional view illustrating the vicinity of the injection hole in the fuel injector according to a second embodiment of the present invention, and FIG. 5 is a view when FIG. 4 is viewed from the direction of arrow B. In these drawings, the valve body 7a, the fuel reservoir 7b, and the nozzle sheet portion 7c are basically the same as those of the fuel injector of the first embodiment, and will not be described again.

In this embodiment, too, the injection hole 9 is flat in cross section. It has an uniform height (h) and the width (w1) of the opening on the outer side which is equal to the width (w2) of the opening on the inner side and thus has a constant cross section of nearly a rectangular slit shape in the direction in which the fuel is injected, and has a very small length in the direction in which the fuel is injected. The opening on the inner side of the injection hole 9 at the upstream end in the direction in which the fuel is injected, is communicated with the fuel reservoir 7b at a nearly rectangular sectional shape with a height (h) and a width (w2). The side wall surface 7d of the fuel reservoir 7b is of a hemispherical shape whereby the fuel pressure in the fuel reservoir 7b equally acts on each portion of the injection hole 9 in the direction of injection. On the other hand, the bottom portion of the fuel reservoir 7b forms a circular flat bottom surface 7f with a diameter (w3) larger than the width (w2) of the opening on the inner side of the injection hole 9 at right angles with the center axis in the direction in which the fuel is injected. In this embodiment, the injection hole has a small length in the direction in which the fuel is injected. Therefore, even if the injection hole does not have a fan shape, the fuel is injected in a fan shape at an angle e defined by the width (W1) of the opening on the outer side of the injection hole 9 with the center of the hemispherical side surface 7d of the fuel reservoir 7b as a vertex 7e.

The fuel injected from the injection hole 9 of the thus constituted fuel injection valve 7 forms a spray of a flat fan shape having a relatively small thickness corresponding to the height (h) of the injection hole 9, and almost all of the fuel comes into sufficient contact with the air taken into the cylinder and is favorably atomized. Furthermore, the bottom portion of the fuel reservoir 7b forms the flat bottom surface 7f having a diameter (w3) larger than the width (w2) of the opening on the inner side of the injection hole 9, and the opening on the inner side of the injection hole 9 is formed in the bottom surface 7f. If the difference between the width (w2) of the opening on the inner side of the injection hole and the diameter (w3) of the bottom surface of the fuel reservoir is set to be greater than an error at a position where the injection hole is formed, the opening on the inner side of the injection hole 9 is necessarily formed in the flat bottom surface 7f of the fuel reservoir 7b not only when the center axis of the injection hole 9 corresponds to the center axis of the fuel reservoir 7b but also when the position for forming the injection hole 9 is deviated and the center axis of the injection hole 9 does not correspond to the center axis of the fuel reservoir 7b. Accordingly, the flat bottom surface 7f necessarily exists around the opening on the inner side of the injection hole 9, and the fuel F flows along the wall surface of the fuel reservoir 7b from the spherical side wall surface 7d to the flat bottom surface 7f, and flows into the injection hole 9. Therefore, the flow-in angle into the injection hole 9 is uniformly limited by the flat bottom surface 7f of the fuel reservoir 7b at any portion, and becomes constant. Accordingly, even when the injection hole 9 is formed at a deviated position, the angle at which the fuel flows into the injection holes 9 remains unchanged so that the fuel is uniformly distributed in the injection hole 9, making it possible to form a fuel spray of a predetermined shape.

Similarly, furthermore, the opening on the inner side of the injection hole 9 is necessarily formed in the flat bottom surface 7f of the fuel reservoir 7b. Therefore, even if an error occurs at the position for forming the injection hole 9, the opening on the inner a side of the injection hole 9 has a constant sectional area, and the fuel is injected in a desired flow rate. In this embodiment, furthermore, the injection hole 9 has a uniform sectional shape of a constant area. Accordingly, the injection hole 9 can be easily formed. Even when the position of the injection hole 9 contains an error in the direction in which the fuel is injected, i.e., in the up-and-down direction in the drawing, there occurs no change in the sectional area of the opening on the inner side of the injection hole 9, and the fuel can be injected at a desired flow rate.

When the fuel injection valve 7 is used for a direct cylinder injection type spark-ignition internal combustion engine as shown in FIG. 1, the spray of a predetermined amount of fuel, which is sufficiently atomized and has a small dispersion in the concentration, can be supplied into the combustion chamber 5a on the top surface of the piston 5 in a compression stroke to accomplish a stratified combustion. Therefore, the stratified combustion takes place more stably. Since the fuel spray has a small thickness, a rate of fuel that can be introduced into the combustion chamber increases. That is, a relatively large amount of fuel can be introduced into the combustion chamber, and the region of stratified combustion can be expanded toward the high-load side.

Figure 6:
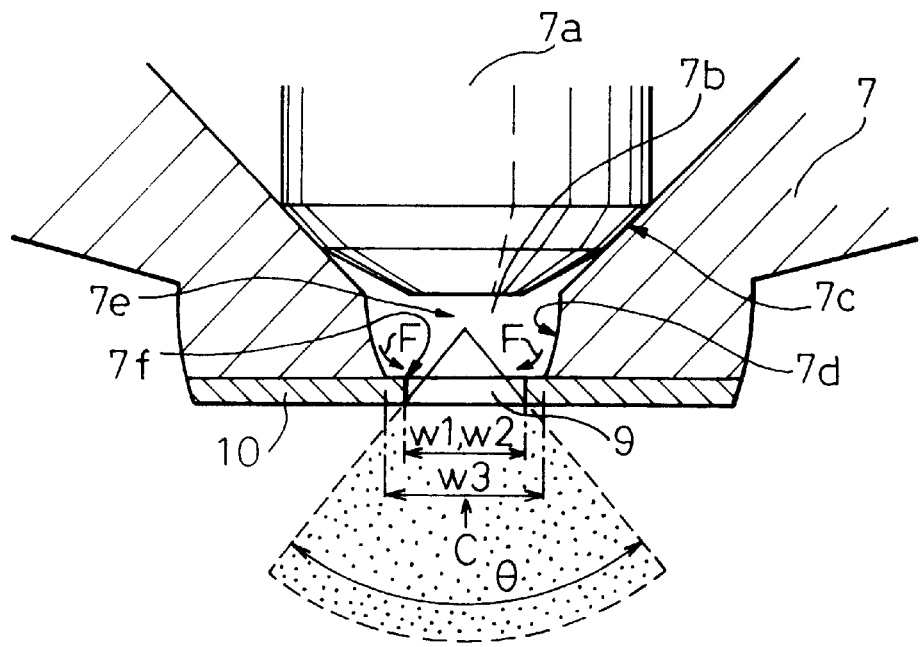
FIG. 6 is an enlarged sectional view illustrating the vicinity of the injection hole in the fuel injector according to a third embodiment of the present invention.
Figure 7:
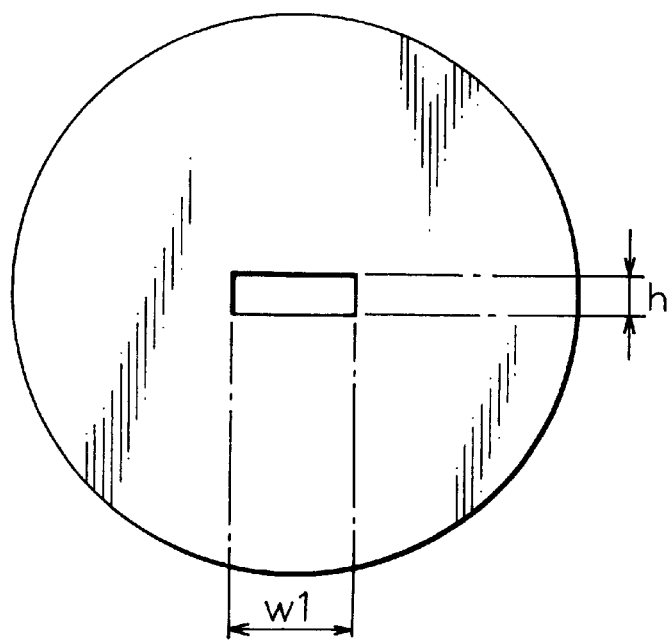
FIG. 7 is a view when

FIG. 6 is an enlarged sectional view illustrating the vicinity of the injection hole in the fuel injector according to a third embodiment of the present invention, and FIG. 7 is a view when FIG. 6 is viewed from the direction of arrow C. In these drawings, the valve body 7a, the fuel reservoir 7b, and the nozzle sheet portion 7c are basically the same as those of the fuel injector of the above-mentioned each embodiment, and will not be described again.

In this embodiment, too, the injection hole 9 is flat in cross section, and has an uniform height (h) and the width (W1) of the opening on the outer side which is equal to the width (w2) of the opening on the inner side and thus has a constant cross section of nearly a rectangular slit shape in the direction in which the fuel is injected, and has a very small length in the direction in which the fuel is injected. In this embodiment, however, the injection hole 9 is not formed in the body of the fuel injector 7 but is formed in a tip member 10 having a flat surface which is a plate member separate from the body of the fuel injector 7. The tip member 10 in which the injection hole 9 is formed is secured by welding to a tip portion of the fuel injector 7. The opening on the inner side of the injection hole 9 at the upstream end, in the direction in which the fuel is injected, is communicated with the fuel reservoir 7b at a nearly rectangular sectional shape with a height (h) and a width (w2). The side wall surface 7d of the fuel reservoir 7b is of a hemispherical shape whereby the fuel pressure in the fuel reservoir 7b equally acts on each portion of the injection hole 9 in the direction of injection. According to this embodiment, therefore, space in the fuel reservoir 7b is defined by the side wall surface 7d of the fuel reservoir 7b and by the flat bottom surface 7f of the tip member 10.

Like in the above-mentioned embodiments, the bottom portion of the fuel reservoir 7b forms a circular flat bottom surface 7f with a diameter (w3) larger than the width (w2) of the opening on the inner side of the injection hole 9 at right angles with the center axis in the direction in which the fuel is injected. That is, in this embodiment, the hemispherical injection hole 7b is formed in the tip portion of the body of the fuel injector 7, and the bottom portion thereof is opened at a circular cross section having the diameter (w3). The injection hole 9 having the width (w2) of the opening of the inner side is formed in the tip portion, and the tip member 10 having a flat surface is combined therewith to thereby constitute the whole shape of the fuel reservoir 7b. In this embodiment, too, even if the injection hole does not have a fan shape, the fuel is injected in a fan shape at an angle 6 defined by the width (W1) of the opening on the outer side of the injection hole 9 with the center of the hemispherical side surface 7d of the fuel reservoir 7b as a vertex 7e, since the injection hole has the small length in the direction in which the fuel is injected.

The fuel injected from the injection hole 9 of the thus constituted fuel injector 7 forms a spray of a flat fan shape having a relatively small thickness corresponding to the height (h) of the injection hole 9, and almost all of the fuel comes into sufficient contact with the air taken into the cylinder and is favorably atomized. Furthermore, the bottom portion of the fuel reservoir 7b forms the flat bottom surface 7f having a diameter (w3) larger than the width (w2) of the opening on the inner side of the injection hole 9, and the opening on the inner side of the injection hole 9 is formed in the bottom surface 7f. If the difference between the width (w2) of the opening on the inner side of the injection hole and the diameter (w3) of the bottom surface of the fuel reservoir is set to be greater than an error at a position where the injection hole is formed, the opening on the inner side of the injection hole 9 is necessarily formed in the flat bottom surface 7f of the fuel reservoir 7b not only when the center axis of the injection hole 9 corresponds to the center axis of the fuel reservoir 7b but also when the position for forming the injection hole 9 is deviated and the center axis of the injection hole 9 does not correspond to the center axis of the fuel reservoir 7b. Accordingly, the flat bottom surface 7f necessarily exists around the opening on the inner side of the injection hole 9, and the fuel F flows along the wall surface of the fuel reservoir 7b from the spherical side wall surface 7d to the flat bottom surface 7f, and flows into the injection hole 9. Therefore, the flow-in angle into the injection hole 9 is uniformly limited by the flat bottom surface 7f of the fuel reservoir 7b at any portion, and becomes constant. Accordingly, even when the injection hole 9 is formed at a deviated position, the angle at which the fuel flows into the injection hole 9 remains unchanged so that the fuel is uniformly distributed in the injection hole 9, making it possible to form a fuel spray of a predetermined shape.

Similarly, furthermore, the opening on the inner side of the injection hole 9 is necessarily formed in the flat bottom surface 7f of the fuel reservoir 7b. Therefore, even if an error occurs at the position for forming the injection hole 9, the opening on the inner side of the injection hole 9 has a constant sectional area, and the fuel is injected at a desired flow rate. Besides, since the injection hole 9 has a uniform sectional shape of a constant area, the injection hole 9 can be easily formed. Even when the position at where the injection hole 9 is formed contains an error in the direction in which the fuel is injected, i.e., in the up-and-down direction in the drawing, there occurs no change in the sectional area of the opening on the inner side of the injection hole 9, and the fuel can be injected at a desired flow rate.

In this embodiment, furthermore, the fuel reservoir 7b defined by the hemispherical side wall surface 7d and by the flat bottom surface 7f, is constituted in combination with the body of the fuel injector 7 and the tip member 10 in which the injection hole 9 is formed. Therefore, the hemispherical fuel reservoir 7b may merely be formed in the body of the fuel injector 7, facilitating the production. This contributes to improving the dimensional precision of the fuel reservoir 7b as a whole.

When the fuel injector 7 is used for a direct cylinder injection type spark-ignition internal combustion engine as shown in FIG. 1, the spray of a predetermined amount of fuel which is sufficiently atomized and has a small dispersion in the concentration, can be supplied into the combustion chamber 5a on the top surface of the piston 5 in a compression stroke to accomplish a stratified combustion. Therefore, the stratified combustion takes place more stably. Since the fuel spray has a small thickness, a rate of fuel that can be introduced into the combustion chamber increases. That is, a relatively large amount of fuel can be introduced into the combustion chamber, and the region of stratified combustion can be expanded toward the high-load side.

Figure 8:
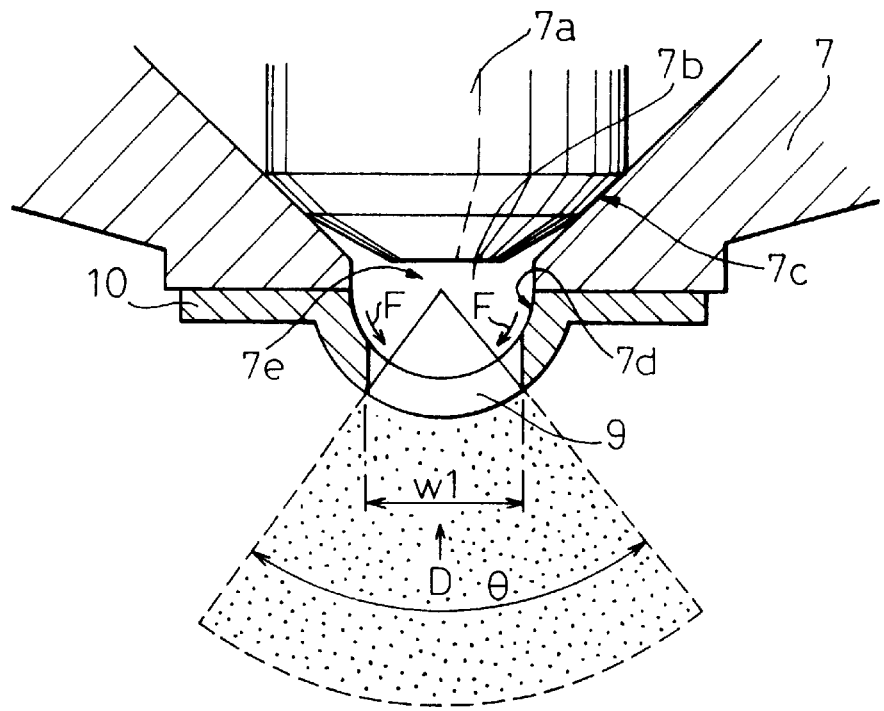
FIG. 8 is an enlarged sectional view illustrating the vicinity of the injection hole in the fuel injector according to a fourth embodiment of the present invention.
Figure 9:
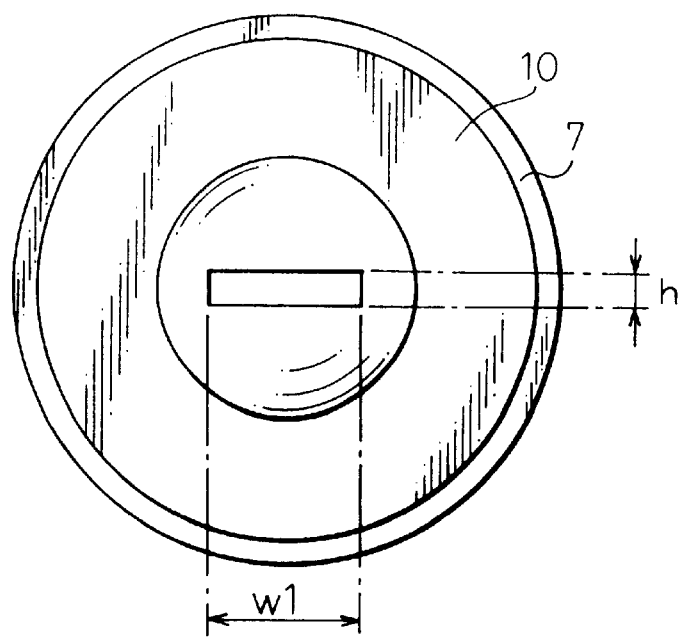
FIG. 9 is a view when

FIG. 8 is an enlarged sectional view illustrating the vicinity of the injection hole in the fuel injector according to a fourth embodiment of the present invention, and FIG. 9 is a view when FIG. 8 is viewed from the direction of arrow D. In these drawings, the valve body 7a and the nozzle sheet portion 7c are basically the same as those of the fuel injector of the above-mentioned each embodiment, and will not be described again.

In this embodiment, too, the injection hole 9 is flat in cross section, and has a constant cross section of nearly rectangular slit shape with a width of (W1) relative to the height (h). The injection hole has a very small length in the direction in which the fuel is injected. The injection hole 9 is not formed in the body of the fuel injector 7 but is formed in the tip member 10 which is a plate member separate from the body of the fuel injector 7. In this embodiment, the hemispherical side wall surface 7d forming the fuel reservoir 7b is also formed in the tip member 10, and the injection hole 9 is communicated with the fuel reservoir 7b. That is, the injection hole 9 and the fuel reservoir 7b are integrally formed in the tip member 10 separate from the body of the fuel injector 7, and the tip member 10 is secured by welding to a tip portion of the fuel injector 7.

In this embodiment, too, the side wall surface 7d of the fuel reservoir 7b is of a hemispherical shape whereby the fuel pressure in the fuel reservoir 7b equally acts on each portion of the injection hole 9 in the direction of injection. Besides, even if the injection hole does not have a fan shape, the fuel is injected in a fan shape at an angle θ defined by the width (W1) of the opening on the outer side of the injection hole 9 with the center of the hemispherical side surface 7d of the fuel reservoir 7b as a vertex 7e, since the injection hole has the small length in the direction in which the fuel is injected.

The fuel injected from the injection hole 9 of the thus constituted fuel injector 7 forms a spray of a flat fan shape having a relatively small thickness corresponding to the height (h) of the injection hole 9, and almost all of the fuel comes into sufficient contact with the air taken into the cylinder and is favorably atomized. Besides, since the fuel reservoir 7b and the injection hole 9 are integrally formed in the common tip member 10, the fuel reservoir 7b can be formed by pressing of a plate member, and the tip member 10 can be formed by press-punching of a portion of the injection hole 9. In this case, the center axis of the fuel reservoir 7b necessarily comes to correspond to the center axis of the injection hole 9 and thus they are not deviated from each other. Accordingly, the fuel F flows uniformly along the wall surface of the fuel reservoir 7b from the spherical side wall surface 7d into the injection hole 9. Therefore, the flow-in angle of the fuel into the injection hole 9 is uniform at any portion, and the fuel is uniformly distributed in the injection hole 9, making it possible to form a fuel spray of a predetermined shape.

In this embodiment, furthermore, the tip member 10 in which are formed the injection hole 9 and the fuel reservoir 7b as defined by the hemispherical side wall surface 7d, is secured to the tip portion of the fuel injector 7, and the center axis of the fuel reservoir 7b corresponds to the center axis of the injection hole 9 at the time of forming the tip member. Therefore, even if an error occurs at the time of mounting the tip member 10 on the tip portion of the fuel injector 7, a deviation in position between the tip member 10 and the body of the fuel injector 7 does not substantially affect the formation of the spray. Therefore, the fuel injector can be easily produced. Besides, since the injection hole 9 has a uniform sectional shape of a constant area, the injection hole 9 can be easily formed.

When the fuel injection valve 7 is used for a direct cylinder injection-type spark ignition internal combustion engine as shown in FIG. 1, the spray of a predetermined amount of fuel which is sufficiently atomized and has a small dispersion in the concentration, can be supplied into the combustion chamber 5a on the top surface of the piston 5 in a compression stroke to accomplish a stratified combustion. Therefore, the stratified combustion takes place more stably. Since the fuel spray has a small thickness, the rate at which fuel can be introduced into the combustion chamber increases. That is, a relatively large amount of fuel can be introduced into the combustion chamber, and the region of stratified combustion can be expanded toward the high-load side.

Figure 10:
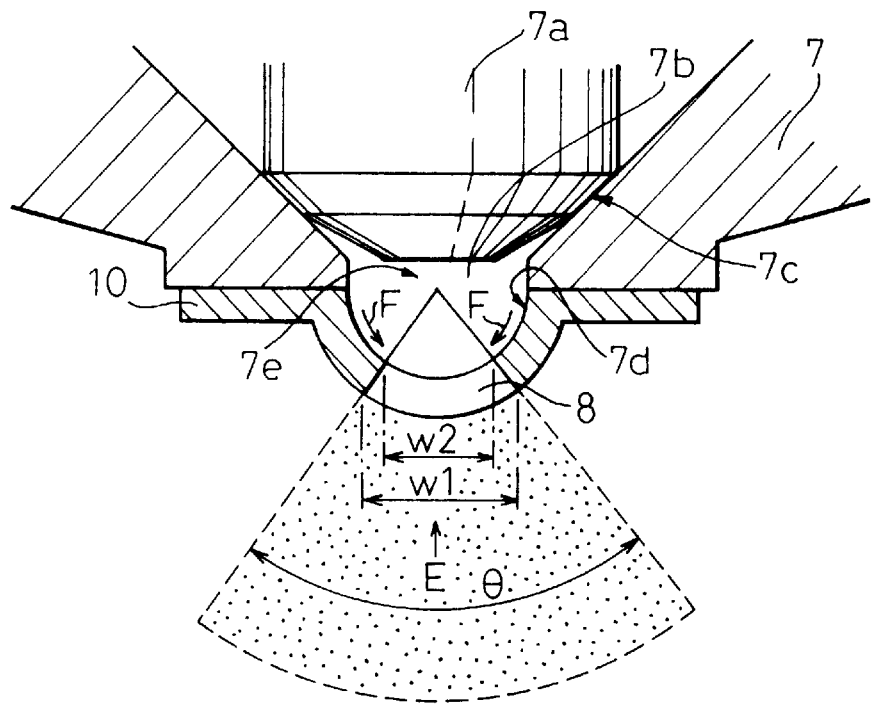
FIG. 10 is an enlarged sectional view illustrating the vicinity of the injection hole in the fuel injector according to a fifth embodiment of the present invention.
Figure 11:
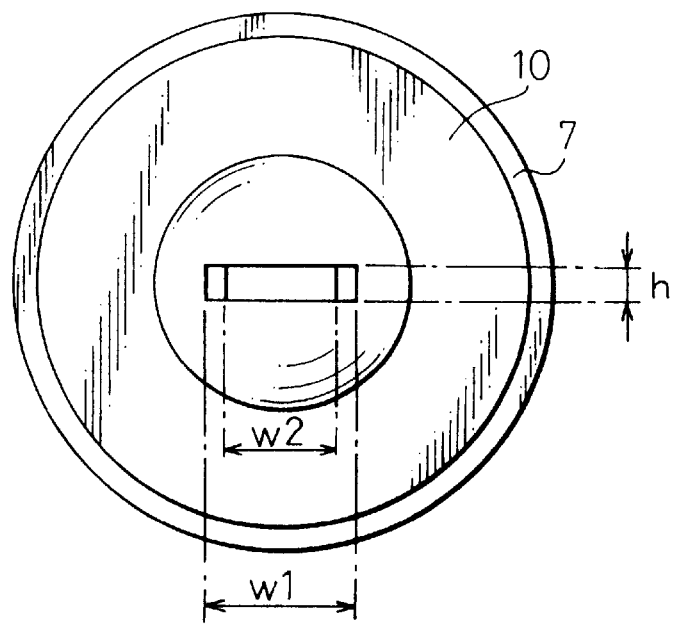
FIG. 11 is a view when

FIG. 10 is an enlarged sectional view illustrating the vicinity of the injection hole in the fuel injector according to a fifth embodiment of the present invention, and FIG. 11 is a view when FIG. 10 is viewed from the direction of arrow E. In these drawings, the valve body 7a and the nozzle sheet portion 7c are basically the same as those of the fuel injector of the above-mentioned each embodiment, and will not be described again.

An opening on the outer side of the injection hole 8 at the downstream end, in a direction in which the fuel is injected, is flat cross section and has the shape of a nearly rectangular slit with a width (W1) larger in the flattened direction than a height (h) thereof. The injection hole 8 has nearly a fan shape of which the width being gradually narrowed inward, i.e., gradually narrowed toward the upstream side, in the direction in which the fuel is injected, so that the fuel can be injected at a predetermined angle e in the direction of width. The opening on the inner side at the upstream end in the direction in which the fuel is injected, is flat in cross section and is communicated with the fuel reservoir 7b at a nearly rectangular cross section having a height (h) and a width (w2). The height of the injection hole 8 is nearly uniform in each direction of injection of a fan shape at the predetermined angle e in the direction of width. The side wall surface 7d of the fuel reservoir 7b is of a hemispherical shape having, as a center, the center of the predetermined angle e in the direction of width for injecting the fuel, i.e., a vertex 7e of a fan of the injection hole 8, whereby the fuel pressure in the fuel reservoir 7b equally acts on each portion of the injection hole 8 in the direction of injection.

The injection hole 8 is not formed in the body of the fuel injector 7 but is formed in the tip member 10 which is a plate member separate from the body of the fuel injector 7. In this embodiment, the hemispherical side wall surface 7d forming the fuel reservoir 7b, too, is formed in the tip member 10. That is, the injection hole 8 and the fuel reservoir 7b are integrally formed in the tip member 10 separate from the body of the fuel injector 7, and the tip member 10 is secured by welding to a tip portion of the fuel injector 7.

The fuel injected from the injection hole 8 of the thus constituted fuel injector 7 forms a spray of a flat fan shape having a relatively small thickness corresponding to the height (h) of the injection hole 8, and almost all of the fuel comes into sufficient contact with the air taken into the cylinder and is favorably atomized. Besides, since the fuel reservoir 7b and the injection hole 8 are integrally formed in the common tip member 10, a part of the injection hole 8 which is uniform in cross section can be punched by pressing of the plate member. Then, the plate member is press-worked to form the fuel reservoir 7b, and the injection hole 8 is cut in a fan shape in the tip member 10. The center axis of the fuel reservoir 7b necessarily comes to correspond to the center axis of the injection hole 8 and thus, they are not deviated from each other. Accordingly, the fuel F flows uniformly along the wall surface of the fuel reservoir 7b from the spherical side wall surface 7d into the injection hole 8. Therefore, the flow-in angle of the fuel into the injection hole 8 is uniform at any portion, and the fuel is uniformly distributed in the injection hole 8, making it possible to form a fuel spray of a predetermined shape.

In this embodiment, furthermore, the tip member 10 in which are formed the injection hole 8 and the fuel reservoir 7b defined by the hemispherical side wall surface 7d, is secured to the tip portion of the fuel injector 7, and the position of the fuel reservoir 7b corresponds to the center axis of the injection hole 8 at the time of forming the tip member. Therefore, even if an error occurs at the time of mounting the tip member 10 on the tip portion of the fuel injector 7, a deviation in position between the tip member 10 and the body of the fuel injector 7 does not substantially affect the formation of the spray. Therefore, the fuel injection valve can be easily produced. Besides, since the injection hole 8 has a fan shape, the fuel smoothly flows along the side of the injection hole 8, and the flat fan shape of the fuel spray that is injected is more stabilized.

When the fuel injection valve 7 is used for a direct cylinder injection type spark-ignition internal combustion engine as shown in FIG. 1, the spray of a predetermined amount of fuel which is sufficiently atomized and has a small dispersion in the concentration can be supplied into the combustion chamber 5a on the top surface of the piston 5 in a compression stroke to accomplish a stratified combustion. Therefore, the stratified combustion takes place more stably.

Since the fuel spray has a small thickness, the rate at which fuel can be introduced into the combustion chamber increases. That is, a relatively large amount of fuel can be introduced into the combustion chamber, and the region of stratified combustion can be expanded toward the high-load side.

Figure 12:
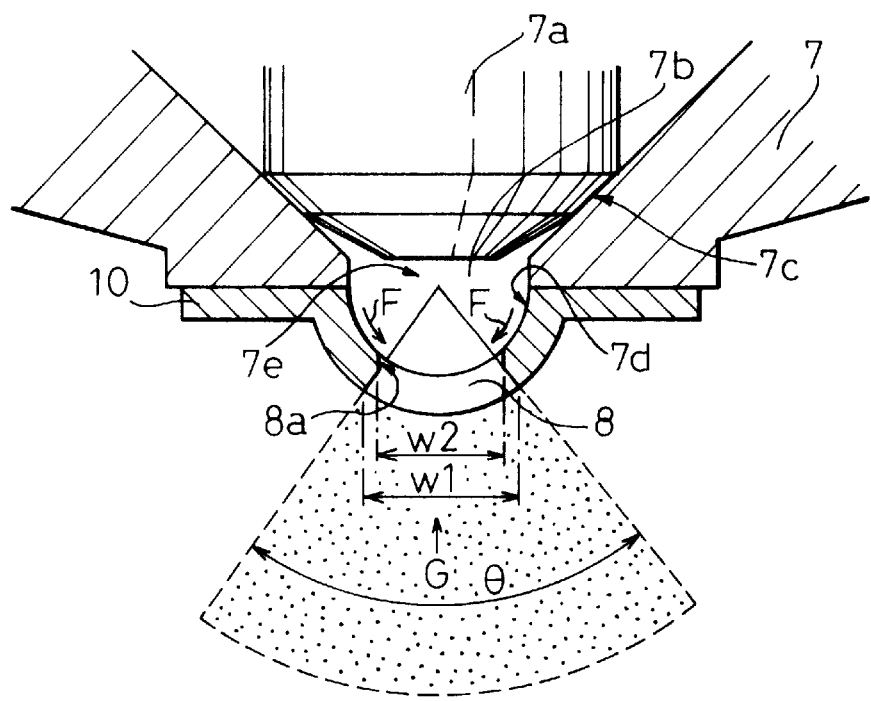
FIG. 12 is an enlarged sectional view illustrating the vicinity of the injection hole in the fuel injector according to a sixth embodiment of the present invention.
Figure 13:
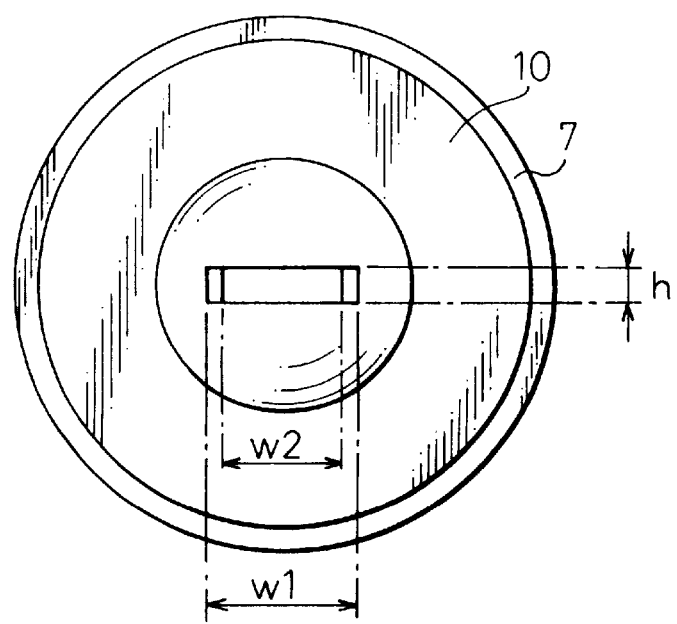
FIG. 13 is a view when
Figure 14:
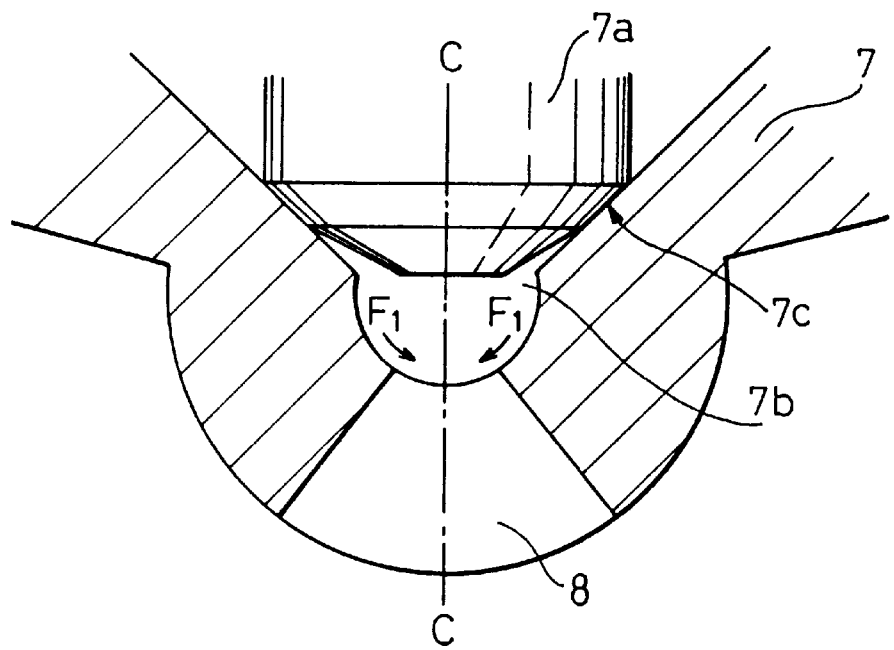
FIG. 14 is an enlarged sectional view illustrating the vicinity of the injection hole in the fuel injector in a related art.
Figure 15:
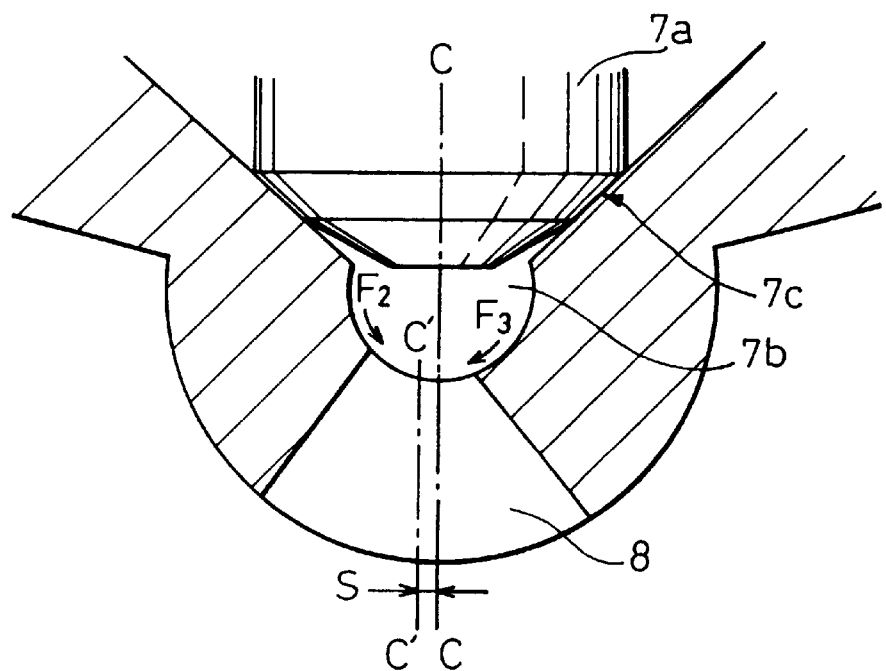
FIG. 15 is an enlarged sectional view illustrating the vicinity of the injection hole in the fuel injector in a related art.

FIG. 12 is an enlarged sectional view illustrating the vicinity of the injection hole in the fuel injector according to a sixth embodiment of the present invention, and FIG. 13 is a view when FIG. 12 is viewed from the direction of arrow G. In these drawings, the valve body 7a and the nozzle sheet portion 7c are basically the same as those of the fuel injector of the above-mentioned each embodiment, and will not be described again.

An opening on the outer side of the injection hole 8 at the downstream end, in a direction in which the fuel is injected, is flat cross section and has the shape of a nearly rectangular slit with a width (W1) larger in the flattened direction than a height (h) thereof. The injection hole 8 has nearly a fan shape of which the width being gradually narrowed inward, i.e., gradually narrowed toward the upstream side in the direction in which the fuel is injected, so that the fuel can be injected at a predetermined angle θ in the direction of width. The opening on the inner side at the upstream end in the direction in which the fuel is injected, is flat cross section and has a nearly rectangular cross section with a height (h) and a width (w2). The height of the injection hole 8 is nearly uniform in each direction of injection of a fan shape at the predetermined angle θ in the direction of width. The side wall surface 7d of the fuel reservoir 7b is of a hemispherical shape having, as a center, the center of the predetermined angle θ in the direction of width for injecting the fuel, i.e., a vertex 7e of a fan of the injection hole 8, whereby the fuel pressure in the fuel reservoir 7b equally acts on each portion of the injection hole 8 in the direction of injection.

A passage 8a of a constant sectional shape having the height (h) and the width (w2), is formed between the opening on the inner side of the injection hole 8 and the fuel reservoir 7b. The injection hole 8 is communicated with the fuel reservoir 7b via the passage 8a.

The injection hole 8 and the passage 8a are not formed in the body of the fuel injector 7 but are formed in the tip member 10 which is a plate member separate from the body of the fuel injector 7. In this embodiment, the hemispherical side wall surface 7d forming the fuel reservoir 7b, too, is formed in the tip member 10. That is, the injection hole 8, passage 8a and fuel reservoir 7b are integrally formed in the tip member 10 separate from the body of the fuel injector 7, and the tip member 10 is secured by welding to a tip portion of the fuel injector 7.

The fuel injected from the injection hole 8 of the thus constituted fuel injector 7 forms a spray of a flat fan shape having a relatively small thickness corresponding to the height (h) of the injection hole 8, and almost all of the fuel comes into sufficient contact with the air taken into the cylinder and is favorably atomized. Besides, since the fuel reservoir 7b, passage 8a and injection hole 8 are integrally formed in the common tip member 10, the fuel reservoir 7b is formed by pressing the plate member, the passage 8a which has a uniform cross section is punched by press-work, and the injection hole 8 is cut in a fan shape thereby to form the tip member 10. The center axis of the fuel reservoir 7b necessarily comes to correspond to the center axis of the injection hole 8 and thus they are not deviated from each other. Accordingly, the fuel F flows uniformly along the wall surface of the fuel reservoir 7b from the spherical side wall surface 7d into the injection hole 8. Therefore, the flow-in angle of the fuel into the injection hole 8 is uniform at any portion, and the fuel is uniformly distributed in the injection hole 8, making it possible to form a fuel spray of a predetermined shape.

In this embodiment, furthermore, the passage 8a having a constant sectional area is formed between the injection hole 8 and the fuel reservoir 7b. Accordingly, the amount of the fuel flowing into the injection hole 8 is limited by the passage 8a. Even if an error occurs in forming the injection hole 8 in the tip member 10, therefore, the fuel can be injected in a desired flow rate. In this embodiment, furthermore, the tip member 10 in which are formed the injection hole 8 and the fuel reservoir 7b defined by the hemispherical side wall surface 7d, is secured to the tip portion of the fuel injector 7, and the center axis of the fuel reservoir 7b corresponds to the center axis of the injection hole 8 at the time of forming the tip member. Therefore, even if an error occurs at the time of mounting the tip member 10 on the tip portion of the fuel injector 7, a deviation in position between the tip member 10 and the body of the fuel injector 7 does not substantially affect the formation of the spray. Therefore, the fuel injection valve can be easily produced. Besides, since the injection hole 8 has a fan shape, the fuel smoothly flows along the side of the injection hole 8, and the flat fan shape of the fuel spray that is injected is more stabilized.

When the fuel injection valve 7 is used for a direct cylinder injection type spark-ignition internal combustion engine as shown in FIG. 1, the spray of a predetermined amount of fuel which is sufficiently atomized and has a small dispersion in the concentration, can be supplied into the combustion chamber 5a on the top surface of the piston 5 in a compression stroke to accomplish a stratified combustion. Therefore, the stratified combustion takes place more stably. Since the fuel spray has a small thickness, the rate at which fuel can be introduced into the combustion chamber increases. That is, a relatively large amount of fuel can be introduced into the combustion chamber, and the region of stratified combustion can be expanded toward the high-load side.

In the above-mentioned embodiments, the fuel reservoir is formed in a semispherical shape. However, the fuel reservoir is not limited in the semispherical shape. The fuel reservoir, for example, may be a suitable shape such as tilted surfaces symmetrical with respect to the center axis thereof.

We claim:

1. A fuel injector for an internal combustion engine having a valve body, an injection hole which has a width larger than a height thereof, and a fuel reservoir on the downstream side of a seat portion of said valve body, wherein said fuel reservoir has a side surface and a bottom surface, one part of said side surface imparts one velocity component oriented in the direction of width in said injection hole to the fuel flow along said one part of said side surface, another part of said side surface imparts another velocity component oriented in the direction of width in said injection hole to the fuel flow along said another part of said side surface, said bottom surface is formed at right angles with the center axis of said injection hole, and said injection hole is communicated with said fuel reservoir via said bottom surface thereof.

2. A fuel injector according to claim 1, wherein said fuel reservoir is nearly a spherical zone shape so that said bottom surface is a circular shape and the diameter of said circular shape is larger than the width of said injection hole at a portion where it is communicated with said fuel reservoir.

3. A fuel injector according to claim 1, wherein a tip member is mounted on the body of said fuel injector, said injection hole is formed on said tip member and the flat surface of said tip member is formed on said bottom surface of said fuel reservoir.

4. A fuel injector according to claim 1, wherein said fuel reservoir and said injection hole are directly formed on the body of said fuel injector.

5. A fuel injector for an internal combustion engine having a valve body, an injection hole which has a width larger than a height thereof, and a fuel reservoir on downstream side of a seat portion of the valve body, wherein said fuel reservoir is communicated with said injection hole, one part of the inside surface of said fuel reservoir imparts one velocity component oriented in the direction of width in the injection hole to the fuel flow along said one part of said inside surface, another part of said inside surface imparts another velocity component oriented in the direction of width in said injection hole to the fuel flow along said another part of said inside surface, a tip member is mounted on the body of said fuel injector, said injection hole and said one part and said another part of said inside surface of said fuel reservoir are formed on said tip member, wherein a passage having a constant cross-section area is formed between said fuel injection hole and said fuel reservoir.

6. A fuel injector according to claim 5, wherein said injection hole is gradually narrowed inward at a predetermined contained angle.

7. A fuel injector according to claim 5, wherein at least one portion of said fuel reservoir which includes said one part and said another part of said inside surface of said fuel reservoir is formed on said tip portion by pressing, and said injection hole is simultaneously punched on said tip portion by said pressing.

* * * * *